United States Patent Office 3,763,265
Patented Oct. 2, 1973

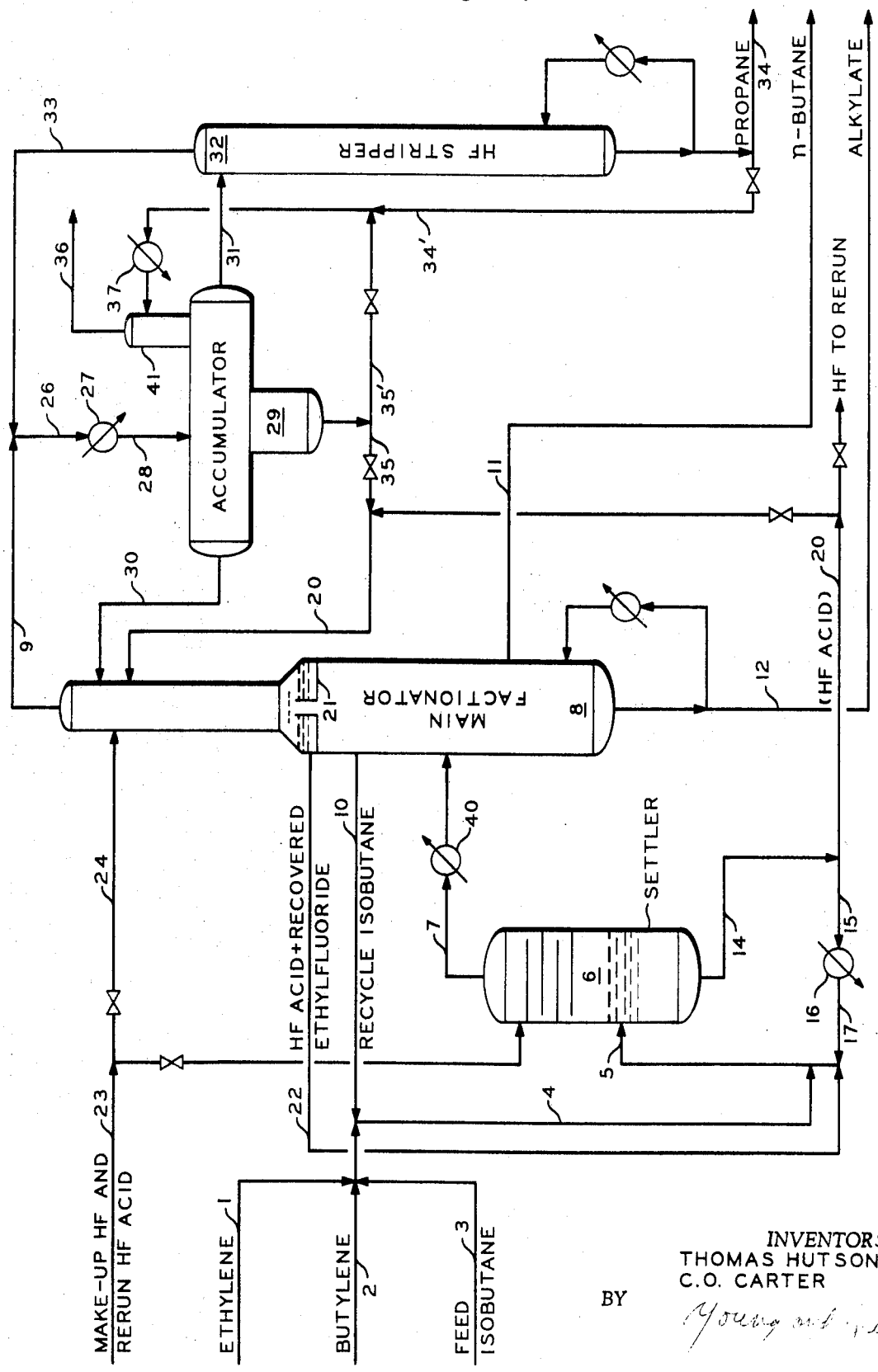

3,763,265
RECOVERY OF ETHYLFLUORIDE FROM ISO-PARAFFIN-ETHYLENE AND HIGHER OLEFIN ALKYLATION BY EXTRACTIVE DISTILLATION OF PROPANE-CONTAINING STREAM OBTAINED FROM ALKYLATION EFFLUENT
Thomas Hutson, Jr., and Cecil O. Carter, Bartlesville, Okla., assignors to Phillips Petroleum Company
Filed Sept. 7, 1971, Ser. No. 178,353
Int. Cl. C07c 3/54
U.S. Cl. 260—683.42      7 Claims

ABSTRACT OF THE DISCLOSURE

In the alkylation of an isoparaffin, e.g. isobutane and/or isopentane with ethylene and a higher olefin, e.g., propylene, butylenes, amylenes, hexenes, etc., the hydrocarbon phase from the alkylation effluent is fractionated and vapors and liquid in the fractionation zone containing propane and ethylfluoride are subjected therein to extractive distillation with hydrogen fluoride, thus recovering ethylfluoride and passing thus recovered ethylfluoride contained in the hydrogen fluoride to alkylation.

---

This invention relates to the alkylation of hydrocarbons. In one of its aspects it relates to the alkylation of an isoparaffin with ethylene and a higher olefin. In another of its aspects the invention relates to the recovery and conversion by alkylation of ethylfluoride formed in the operation.

In one of its concepts the invention provides a process for the alkylation of, say, isobutane and/or isopentane with ethylene and a higher olefin, for example, at least one of propylene, butylenes, amylenes, hexenes, etc., in the presence of hydrogen fluoride as catalyst, recovering the hydrocarbon phase from the alkylation effluent, fractionating said hydrocarbon phase to form vapors containing essentially propane and ethylfluoride and a liquid containing propane and akyl fluoride, subjecting said vapors and said liquid to extractive distillation with hydrogen fluoride to recover therefrom ethylfluoride and passing the hydrogen fluoride containing recovered ethylfluoride to alkylation. In another of its concepts the invention prepares for performing an extractive distillation operation in the upper portion of a fractionator fractionating HF alkylation effluent to remove from the light hydrocarbon phase containing essentially propane and ethylfluoride ethylfluoride contained therein and passing hydrogen fluoride containing recovered ethylfluoride to alkylation. In a further concept of the invention, at least a part of the hydrogen fluoride used to recover the ethylfluoride is obtained from the conventional settler employed to settle the alkylation effluent. In a still further concept of the invention, at least a portion of the acid used to recover the ethylfluoride is obtained from the conventional depropanizer overhead settler, thus providing a relatively stronger hydrogen fluoride than that obtained from the alkylation reactor effluent settler. Further, in another concept of the invention, it provides a process as herein described wherein the makeup hydrogen fluoride and/or rerun HF is used to recover the ethylfluoride from the propane vapors and/or liquid as herein described.

It is known to alkylate an isoparaffin with an olefin. The conditions for such an alkylation are well known in the art.

In Ser. No. 138,991, filed Apr. 30, 1971, there is described and claimed a process for the alkylation of at least one isoparaffin with ethylene which comprises conducting the alkylation with intimate admixture of the reactants and hydrogen fluoride catalyst in the presence of a substantial amount of a higher olefin. In this earlier application filed by us, conditions are set forth for the use of HF catalyst which contains zero to about four weight percent $BF_3$, based on the HF content of the catalyst being employed. Mol ratios of isoparaffin to total olefin range from about 1.5 to 1 to about 25 to 1 and the weight percent of higher olefin in the total olefin is above about 5. Conditions are given both for the use of HF catalyst with and without the $BF_3$. The disclosure of said application is incorporated herein by reference.

The formation of ethylfluoride, although it can be considerably minimized if not entirely eliminated, is under some conditions unavoidable. This ethylfluoride can be used to increase the total alkylate yield as well as to improve its properties. The alkylation of an isoparaffin with ethylfluoride, except as used in the combination operation of this application, forms no part of our invention.

An object of this invention is to provide a process for the alkylation of an isoparaffin with an olefin. Another object of the invention is to provide for the alkylation of an isoparaffin with ethylene and a higher olefin. A further object of the invention is to provide a process for the recovery of ethylfluoride formed in an alkylation of an isoparaffin with ethylene and a higher olefin. A still further object of the invention is to provide a process for the alkylation of an isoparaffin with ethylene and a higher olefin in which ethylfluoride is recovered advantageously with only minor modification of existing plant equipment so that the recovered ethylfluoride can be reused as in the alkylation step.

Other aspects, concepts, objects and the several advantages of this invention are apparent from a study of this disclosure, the drawing and the appended claims.

According to the invention for the alkylation of an isoparaffin with ethylene and a higher olefin which comprises conducting the alkylation, separating an alkylation effluent-hydrocarbon phase, subjecting said phase to fractionation in a fractionation zone to recover therefrom as an overhead a propane containing stream and as bottoms an alkylate stream, introducing into a upper portion of said zone liquid hydrogen fluoride in a manner to maintain therein a liquid hydrogen fluoride phase and a liquid hydrocarbon phase, subjecting the rising vapors in said portion of said zone and the hydrocarbon liquid in said zone to the action of said liquid hydrogen fluoride phase under extractive distillation contacting conditions to remove from said vapors and said hydrocarbon liquid ethylfluoride therein, removing from said portion of said zone a solution of liquid hydrogen fluoride containing dissolved therein ethylfluoride and passing said solution to said alkylation.

Also according to the present invention, the HF introduced into the fractionation zone is at least in part obtained from the conventional depropanizer overhead or fractionation zone overhead by cooling, condensing and settling the same, thus obtaining an acid of higher strength or purity which more advantageously can be used to better remove ethylfluoride from the depropanizer section of the fractionation zone Still according to the invention, the HF introduced into the depropanizer section of the fractionation zone will at least in part consist of makeup hydrogen fluoride or rerun HF acid or both.

Further, still according to the invention, the fractionator of a conventional alkylation operation in which ethylfluoride is formed and from which it can be recovered according to the present invention, is modified to provide for introducing, say, just below the reflux to the top of the depropanizer section an HF acid suitable for recovering from said section the ethylfluoride therein and said section is also provided with a trap out tray, for example, of the ring and doughnut type, on which there collects as a lower phase the HF acid introduced and now containing the ethylfluoride, the HF phase thus produced being removed together with its dissolved ethylfluoride and passed to alkylation.

Referring now to the drawing, ethylene, butylene and makeup isobutane are fed by 1, 2 and 3 through 4 into a riser reactor 5 and then to settler 6 wherein alkylation effluent is settled forming a hydrocarbon phase taken off by 7 and passed to heater 40 and then to fractionator 8 wherein propane is taken off as overhead 9, isobutane is taken off as liquid side draw 10, n-butane is taken off as vapor side draw 11, and alkylate bottoms are removed at 12. Acid phase from settler 6 is passed by 14, 15, cooler 16 and 17 to riser reactor 5 for reuse. According to the invention, at least a portion of this acid is passed by 20 to the upper portion of fractionator 8 in which it is contacted under extractive distillation conditions with rising vapors and with liquid extant in this portion. The upper section of tower 8 is equipped with contacting trays and downcomers of that employed in the art. It can be otherwise equipped for suitable liquid-liquid and vapor-liquid contact. There is installed ring and doughnut tray 21 on which there collects liquid HF containing ethylfluoride. The liquid HF is passed by 22 to riser reactor 5, according to the invention.

At least a portion of the acid introduced into the upper portion of fractionator 8 can be makeup HF and/or rerun HF acid introduced by 23 and passed by 24 to said upper portion of fractionator 8.

Overhead 9 from the fractionator is passed by 9, 26, cooler condenser 27 and 28 to settler 29 wherein an upper liquid hydrocarbon phase consisting of propane is formed on a liquid HF phase. Vent gases pass through cleanup absorber 41 and thus to fuel through 36. At least a portion of the hydrocarbon phase is passed by 30 to the upper portion of fractionator 8 as reflux therefor. Production quantities of propane are passed by 31 to HF stripper 32 from which relatively pure HF along with some propane is taken overhead by 33 and passed by 26, 27, and 28 to settler 29. Propane yield is removed at 34. Acid from settler 29 is passed by 35 to 20 and then to the upper portion of fractionator 8, in this embodiment, this acid being introduced below the reflux entering by 30. A portion of this acid 35′ can be used on the vent gas absorber 41. As alternates propane from 34 can be used via 34′, or indirect chilling can be used. The absorbents must be cooled if they are used, e.g., at 37.

It is within the scope of the invention to vary the proportions of the several HF streams which can be employed. Suffice to say, one skilled in the art will adjust the acid quality to obtain the desired recovery of ethylfluoride for return by stream 22 to the alkylation.

Further, some or all of the relatively pure HF acid can be introduced at a point or points below the introduction of the HF acid introduced by 20. Introduction of the HF acid above the reflux is now not preferred.

It will be evident to one skilled in the art in possession of this disclosure, having studied the same, that the rectification section or depropanizer section of the so-called main fractionator has been redesigned to handle two liquid phases encountered in an extractive distillation step, thereby to recover the ethylfluoride in the depropanizer section.

In Ser. No. 120,588, filed Mar. 3, 1971, by use, there is described and claimed, a process for the alkylation of an isoparaffin with ethylene and a higher olefin in the presence of a hydrogen fluoride catalyst which comprises conducting said alkylation in an alkylation zone to produce an alkylation effluent, separating from said effluent an alkylate containing hydrocarbon phase and a hydrogen fluoride phase, recovering from said hydrocarbon phase an isoparaffin containing stream also containing hydrogen fluoride, propane and alkyl fluoride, returning a portion of said stream to said zone, passing another portion of said stream to a depropanizer zone, in said depropanizer zone separating an isoparaffin stream and a stream containing HF and propane, passing the last said stream to solvent extraction with liquid HF to remove alkyl fluoride into said HF thus generating a stream of alkyl fluoride-containing HF, and passing said liquid HF to said alkylation zone.

The disclosure of said application Ser. No. 120,588, is incorporated herein by reference.

In said application, it is disclosed, as known in the art, that ethylfluoride contained in a proparne stream is difficultly separable from said stream.

It will be noted that in the present application existing equipment has been altered and/or redesigned with attendant efficiencies.

The following is a specific example showing to one skilled in the art an operation according to the invention.

SPECIFIC EXAMPLE

Feed (7) to column (8)

| | Barrels per day |
|---|---|
| Ethylene | (1) |
| Ethane | 56.5 |
| Ethylfluoride | 1,565.1 |
| Propane | 613.5 |
| Isobutane | 40,435.1 |
| n-Butane | 3,075.6 |
| Alkylate (C$_5$ and heavier) | 5,159.8 |
| Total | 50,905.6 |

[1] 3.64 tons per day.

Recycle isobutane (10)

| | Barrels per day |
|---|---|
| Ethylene | ------ |
| Ethane | 27.0 |
| Ethylfluoride | 672.9 |
| Propane | 587.2 |
| Isobutane | 39,581.7 |
| n-Butane | 3,010.8 |
| Pentanes plus | 7.3 |
| Total | 43,886.9 |

HF+dissolved components (22)

| | Barrels per day |
|---|---|
| Ethylene | ------ |
| Ethane | 0.3 |
| Ethylfluoride | 937.6 |
| Propane | 9.5 |
| Isobutane | 633.1 |
| n-Butane | 48.2 |
| Alkylate (C$_5$ and heavier) | 0.5 |
| Hydrogen fluoride | 2,943.0 |
| Total | 4,572.2 |

Vent gas (36) from vent gas absorber (41)

Ethane (to fuel gas) _____ 29.7

HF solvent (35′) to vent gas absorber (41)

Vol. of solvent/(liquid) vol. of vent gas_____ 1:1 to 3:1 n-Butane vapor side draw (11)

| | Barrels per day |
|---|---|
| Isobutane | 25.0 |
| n-Butane | 160.4 |
| Alkylate (C$_5$ and heavier) | 0.4 |
| Total | 185.8 |

Propane product (34): _____ 32.2
Product alkylate (C$_5$ plus)(12): _____ 5,159.4
HF solvent (20): _____ 2,943

HF solvent to hydrocarbon overhead (mol ratio) in distillation zone:

| | |
|---|---|
| Range | 1:1 to 5:1 |
| Specific | 2.5 to 1 |

Alkylate properties:

| | |
|---|---|
| API gravity, 60/60° F. | 76 |
| Liquid density, lbs./bbl. | 238.4 |
| ASTM distillation End Point, ° F. | 317 |
| Research octane (0 cc. TEL) | 100.9 |
| Motor octane (0 cc. TEL) | 94.8 |
| Research octane (3 cc. TEL) | 115.3 |
| Motor octane (3 cc. TEL) | 110.8 |

Process conditions:

| | |
|---|---|
| Catalyst/hydrocarbon in reactor, volume ratio | 4:1 |
| Isobutane/olefin in reactor, mol ratio | 10:1 |
| Reactor temperature, ° F. | 90 |
| Reactor pressure, p.s.i.g. | 190 |
| Reactor residence time, sec. | 60 |
| Ethylene conversion (single pass), percent | 98 |
| Alkylate yield, lbs./lb. olefin | 2.72 |
| Main fractionator (8): | |
| Top, ° F. | 136 |
| Feed, ° F. | 185 |
| Isobutane recycle tray, ° F. | 206 |
| n-Butane removal tray, ° F. | 246 |
| Kettle, ° F. | 431 |
| Pressure, p.s.i.g. | 287 |
| Reflux, ° F. | 100 |
| Vent gas absorber top, ° F. | −40 |
| HF Stripper (32): | |
| Top temp., ° F. | 130 |
| Bottom temp., ° F. | 197 |
| Pressure, p.s.i.g. | 287 |

An essential feature of the invention is the use of an extractive distillation step to accomplish the separation and recovery of ethylfluoride from propane. This extraction is carried out in the depropanizer or main fractionator column using liquid hydrofluoric acid. Hydrofluoric acid from the alkylation settler is introduced sufficiently below the entry point for hydrocarbon reflux so that hydrocarbons heavier than propane in the hydrofluoric acid do not go overhead. Substantially all the ethylfluoride is extracted by the hydrofluoric acid and removed from the fractionator near the bottom of the rectification section. The amount of liquid hydrofluoric acid solvent to the main fractionator is adjusted to control the loss of ethylfluoride in the fractionator overhead. The operational pressure on the main fractionator can vary substantially. That used in the example permits use of conventional cooling with water. Column cross section is dependent on the type of mechanical tray selected.

Reasonable variation and modification are possible within the scope of the foregoing disclosure, drawing and the appended claims to the invention, the essence of which is that there has been set forth and described the recovery and recycle of ethylfluoride extracted from a depropanizer section of the fractionation zone in an alkylation of an isoparaffin with ethylene and a higher olefin by introducing into said depropanizer section a suitable HF acid or hydrogen fluoride under extractive distillation conditions to recover the ethylfluoride and wherewith to pass the same to the alkylation.

We claim:

1. The alkylation of an isoparaffin with ethylene and a higher olefin which comprises conducting the alkylation, separating an alkylation effluent hydrocarbon phase, subjecting said phase to fractionation in a fractionation zone to recover therefrom as an overhead a propane-containing stream and as bottoms an alkylate stream, introducing into an upper portion of said zone liquid hydrogen fluoride, subjecting the rising hydrocarbon vapors containing difficultly separable ethylfluoride in said portion of said zone to the action of said liquid hydrogen fluoride by extractive distillation to remove from said vapors said ethylfluoride therein, removing from an intermediate portion of said fractionation zone a solution of liquid hydrogen fluoride containing dissolved therein ethylfluoride and passing said solution to said alkylation.

2. An alkylation according to claim 1 wherein the fractionation overhead is settled to produce a hydrocarbon phase and an acid phase and at least a portion of said acid phase is introduced into said upper portion of said zone.

3. An alkylation according to claim 1 wherein the overhead propane containing stream is condensed and settled obtaining a hydrocarbon phase and a hydrogen fluoride phase and the hydrogen fluoride phase is at least in part the liquid hydrogen fluoride introduced into said upper portion of said zone.

4. An alkylation according to claim 1 wherein the isoparaffin is at least one of isobutane and isopentane and the higher olefin is at least one of propylene, butylene, amylene and hexylene.

5. An akylation according to claim 1 wherein the liquid HF introduced into said zone is at least in part fresh or rerun HF acid having a relatively high solvency for ethylfluoride.

6. An alkylation according to claim 1 wherein the overhead from said fractionator is cooled, condensed and settled and at least a portion of the hydrocarbon phase thus obtained is subject to stripping to remove HF therefrom and said HF is recovered and used as HF which is used in said upper portion of said fractionation zone.

7. An alkylation according to claim 1 wherein the conditions in said portion of said zone are: operating pressure of about 287 p.s.i.g., the temperature at the locus of hydrofluoric acid introduction is about 136° F., isobutane removal locus is about 206° F., and the mol ratio of hydrogen fluoride to hydrocarbon is no more than about 5:1.

References Cited
UNITED STATES PATENTS

| | | | |
|---|---|---|---|
| 3,253,054 | 5/1966 | Van Pool | 260—683.48 |
| 3,431,079 | 3/1969 | Chapman | 260—683.48 |
| 3,435,092 | 3/1969 | Hutson, Jr. et al. | 260—683.48 |
| 3,579,603 | 5/1971 | Jones | 260—683.48 |
| 3,594,444 | 7/1971 | Jones | 260—683.48 |

DELBERT E. GANTZ, Primary Examiner

G. J. CRASANAKIS, Assistant Examiner

U.S. Cl. X.R.

260—683.48